United States Patent
Vreys

(10) Patent No.: US 11,091,633 B2
(45) Date of Patent: Aug. 17, 2021

(54) COMPOSITIONS USEFUL IN PREPARING RECYCLABLE POLYCARBONATE SHEETING HAVING A MATTE APPEARANCE

(71) Applicant: TRINSEO EUROPE GMBH, Horgen (CH)

(72) Inventor: Mark Vreys, Oostakker (BE)

(73) Assignee: TRINSEO EUROPE GMBH, Horgen (CH)

(*) Notice: Subject to any disclaimer, the term of this patent is extended or adjusted under 35 U.S.C. 154(b) by 0 days.

(21) Appl. No.: 16/635,210

(22) PCT Filed: Aug. 30, 2018

(86) PCT No.: PCT/EP2018/073338
§ 371 (c)(1),
(2) Date: Jan. 30, 2020

(87) PCT Pub. No.: WO2019/043094
PCT Pub. Date: Mar. 7, 2019

(65) Prior Publication Data
US 2020/0354568 A1    Nov. 12, 2020

Related U.S. Application Data

(60) Provisional application No. 62/552,016, filed on Aug. 30, 2017.

(51) Int. Cl.
| | |
|---|---|
| C08L 69/00 | (2006.01) |
| C09D 169/00 | (2006.01) |
| B32B 27/36 | (2006.01) |
| C08K 3/04 | (2006.01) |
| C08K 3/34 | (2006.01) |
| B32B 27/20 | (2006.01) |
| C08K 13/02 | (2006.01) |

(52) U.S. Cl.
CPC ............. *C08L 69/00* (2013.01); *B32B 27/20* (2013.01); *B32B 27/365* (2013.01); *C08K 13/02* (2013.01); *B32B 2307/408* (2013.01); *B32B 2439/40* (2013.01); *B32B 2457/00* (2013.01); *B32B 2535/00* (2013.01); *B32B 2605/08* (2013.01)

(58) Field of Classification Search
CPC ..... C08L 69/00; C08L 69/005; C09D 169/00; C09D 169/005; B32B 27/365; B32B 2307/408
See application file for complete search history.

(56) References Cited

U.S. PATENT DOCUMENTS

| | | | |
|---|---|---|---|
| 3,419,634 | A | 12/1968 | Vaughn, Jr. |
| 4,401,804 | A | 8/1983 | Wooten et al. |
| 4,532,290 | A | 7/1985 | Jaquiss et al. |
| 5,922,816 | A | 7/1999 | Hamilton |
| 2002/0137822 | A1 | 9/2002 | Seidel et al. |
| 2003/0199622 | A1 | 10/2003 | Vathauer et al. |
| 2007/0299169 | A1* | 12/2007 | Ohira ...................... C08L 69/00 524/100 |
| 2009/0043038 | A1 | 2/2009 | Rogunova et al. |
| 2013/0131241 | A1 | 5/2013 | van de Grampel et al. |
| 2016/0340508 | A1* | 11/2016 | Kim ........................... C08J 5/08 |

FOREIGN PATENT DOCUMENTS

| | | |
|---|---|---|
| EP | 0375932 A2 | 6/1991 |
| EP | 0640655 A2 | 5/1995 |
| JP | H110217412 A | 8/1998 |

OTHER PUBLICATIONS

Second International Search Report for co-pending International Application No. PCT/EP2018/073338 dated Oct. 18, 2019; (12 pages).
Written Opinion by International Search Authority for co-pending International Application No. PCT/EP2018/073338 dated Mar. 7, 2019 (5 pages).
International Search Report for PCT/EP2018/073338 (dated Oct. 26, 2018).

* cited by examiner

*Primary Examiner* — Vu A Nguyen
(74) *Attorney, Agent, or Firm* — Young Basile Hanlon & MacFarlane, P.C.

(57) ABSTRACT

A composition comprising one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$, optionally a buffering agent for basic materials and optionally one or more antioxidants useful with polycarbonate containing compositions. Also disclosed are sheets containing one or more layers of this composition. The sheets exhibit matte surface appearance and are easily recyclable.

14 Claims, No Drawings

COMPOSITIONS USEFUL IN PREPARING RECYCLABLE POLYCARBONATE SHEETING HAVING A MATTE APPEARANCE

CROSS REFERENCE TO RELATED APPLICATIONS

This application is a National Stage 371 entry of PCT/EP2018/073338 filed on Aug. 30, 2018, which claims priority from U.S. Provisional Application No. 62/552,016 filed Aug. 30, 2017, incorporated herein by reference in its entirety for all purposes.

FIELD

The disclosure relates to compositions consisting essentially of polycarbonates and copolymers containing polycarbonates which are useful in preparing recyclable polycarbonate based sheets which have a matte appearance and to the sheets prepared from the compositions.

BACKGROUND

Polycarbonate and copolymers containing polycarbonate are utilized in a wide variety of molded structures, for instance automotive parts, medical devices, medical device components, electronic device components, such as cell phones, and luggage. Polycarbonates and copolymers of polycarbonates form structures that are rigid which have rigid surfaces. In a number of these uses a matte appearance of the surface of the structures formed is desired. Polycarbonates form structures with a glossy surface appearance. The high quality properties of polycarbonates and copolymers of polycarbonates are desired along with a matte surface appearance. Structures containing polycarbonates or copolymers thereof having a matte surface appearance are conventionally prepared from blends of polycarbonates with other thermoplastic polymers for instance ABS, see EP 0375932. It is difficult to recycle structures prepared from such blends. The market demands structures containing polycarbonates or copolymers thereof having a matte surface appearance which can be easily recycled.

What is needed are compositions containing polycarbonates or copolymers of polycarbonates which form structures having a matte surface appearance. What are also needed are sheets prepared from such compositions that exhibit a matte surface appearance.

SUMMARY

Disclosed are compositions comprising one or more polymers consisting of polycarbonate or a copolymer of greater than 50 mole percent of polycarbonate units and less than 50 mole percent of monomer units which copolymerize with polycarbonate units; and 5 to 20 percent by weight of one or more minerals containing high aspect ratio $CaSiO_3$. Such compositions may include a buffering agent or stabilizing salt for basic materials. The buffering agent for basic materials may be a salt of a phosphorous acid such as monosodiumphosphate. The composition may include one or more antioxidants useful with polycarbonate containing compositions.

Disclosed is a composition which contains only, consists of, of one or more polymers consisting of polycarbonate or a copolymer of greater than 50 mole of polycarbonate units and less than 50 mole percent of monomer units which copolymerize with polycarbonate units; 5 to 20 percent by weight of one or more minerals containing high aspect ratio $CaSiO_3$; a stabilizing salt or a buffering agent for basic materials; and one or more antioxidants useful with polycarbonate containing compositions. The one or more polycarbonates or copolymers thereof may be branched, linear or a mixture of branched and linear polycarbonates or copolymers thereof.

Disclosed is a composition comprising a blend of a polycarbonate composition containing one or more polymers consisting of polycarbonate or a copolymer of greater than 50 mole percent of polycarbonate units and less than 50 percent by weight of monomer units which copolymerize with polycarbonate units; and 5 to 20 percent by weight of one or more minerals containing high aspect ratio $CaSiO_3$, optionally one or more buffering agents for basic materials and optionally one or more antioxidants useful with polycarbonate containing compositions with another polycarbonate composition that does not contain high aspect ratio $CaSiO_3$, that is unfilled. Such blend contains 33 percent by weight or greater of the composition containing high aspect ratio $CaSiO_3$. Such a blend may contain from 5 percent by weight to 67 percent by weight of an unfilled polycarbonate, which does not contain high aspect ratio $CaSiO_3$.

Disclosed are compositions comprising a sheet prepared from one or more compositions as disclosed in this application. The sheet may contain only one or more of the compositions disclosed herein, that is a composition which contains one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$; optionally a buffering agent for basic materials; and optionally one or more antioxidants useful with polycarbonate containing compositions. The one or more polycarbonates or copolymers thereof may be branched, linear or a mixture of branched and linear polycarbonates or copolymers thereof. The sheet may comprise two or more layers wherein one or more surfaces comprise a composition which contains one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$; optionally a buffering agent for basic materials; and optionally one or more antioxidants useful with polycarbonate containing compositions. The surfaces prepared from a composition which contains one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$; optionally a buffering agent for basic materials; and optionally one or more antioxidants useful with polycarbonate containing compositions exhibit a matte appearance. The sheets may be prepared using any conventional method for forming sheets from polycarbonate containing materials. The sheets may be prepared by extrusion, co-extrusion or lamination. Disclosed are sheets having layers of unfilled polycarbonates and layers prepared from a composition comprising one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$; optionally a buffering agent for basic materials; and optionally one or more antioxidants useful with polycarbonate containing compositions. Disclosed are sheets wherein the layer comprising one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$, optionally a buffering agent for basic materials; and optionally one or more antioxidants useful with polycarbonate containing compositions, is 5 to 95 percent of the thickness of the sheet.

The compositions disclosed containing one or more minerals containing high aspect ratio $CaSiO_3$ may form sheets having matte surface appearance. Sheets prepared having such compositions on one or more surfaces exhibit a matte appearance on such surfaces. The matte surfaces may exhibit a top gloss measured according to ISO 2813 with a 60° angle of incidence of about 60 or less, or 40 or less.

DETAILED DESCRIPTION

The explanations and illustrations presented herein are intended to acquaint others skilled in the art with the disclosure, its principles, and its practical application. Accordingly, the specific embodiments of the present disclosure as set forth are not intended as being exhaustive or limiting of the claims. The scope of the claims should, therefore, be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Disclosed are compositions comprising one or more polycarbonates or copolymers of polycarbonate and monomer units which copolymerize with polycarbonate units; and one or more minerals containing high aspect ratio $CaSiO_3$; wherein the amount of the one or more minerals containing high aspect ratio $CaSiO_3$ is sufficient to form a sheet having a matte surface appearance when such composition is located on the surface of the sheet. The sheets may be prepared form 100 percent of such a composition or maybe prepared from layers of the composition and layers of polycarbonate and/copolymers of polycarbonate and other monomers which do not contain the one or more minerals containing high aspect ratio $CaSiO_3$. Where there are two or more layers the surface for which a matte appearance is desired may contain one or more minerals containing high aspect ratio $CaSiO_3$. The layers which provide a matte surface appearance desirably do not contain any polymer other than polycarbonates or copolymers thereof.

One or more as used herein means that at least one, or more than one, of the recited components may be used as disclosed. As used herein percent by weight or parts by weight refer to, or are based on, the weight of the disclosed compositions unless otherwise specified.

Polycarbonate as used herein means a polymer containing carbonate units. Such polymers may be homopolymers consisting essentially of carbonate monomer units or copolymers containing one or more other monomer units (co-monomer units). Such copolymers may be block copolymers containing two or more blocks of different monomer units or may be random copolymers with the different monomer units randomly located along the polymer backbone. The other monomer units may comprise any monomer units that do not negatively impact the inherent properties of polycarbonates, for instance heat resistance, impact resistance, moldability and transparency, where required for the intended use. Among exemplary comonomer units are ester units and polysiloxane units. The amount of carbonate monomer units in copolycarbonates is selected such that the resulting polymer retains the desirable properties of polycarbonates, for instance heat resistance, impact resistance, moldability and transparency, where required for the intended use. The copolycarbonates may contain greater than 50 mole percent carbonate monomer units, about 75 mole percent or greater carbonate monomer units, about 80 mole percent or greater carbonate monomer units or about 85 mole percent or greater carbonate monomer units. The copolycarbonates may contain about 99 mole percent or less carbonate monomer units, about 97 mole percent or less carbonate monomer units or about 95 mole percent or less carbonate monomer units. The copolycarbonates may contain about 1 mole percent or greater co-monomer monomer units, about 3 mole percent or greater co-monomer monomer units or about 5 mole percent or greater co-monomer monomer units. The copolycarbonates may contain less than 50 mole percent co-monomer monomer units, about 25 mole percent or less co-monomer monomer units, about 20 mole percent or less co-monomer monomer units or about 15 mole percent or less co-monomer monomer units. The polycarbonate units may contain aromatic units in the backbone of the polymer.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols. Diphenols for the production of the aromatic polycarbonates and/or aromatic polyester carbonates may correspond to formula I

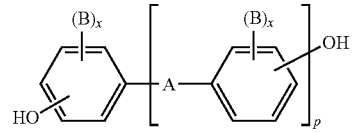

wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO2-, or a $C_6$-$C_{12}$ arylene, on to which other aromatic rings, which optionally contain hetero atoms, can be condensed, or a radical of formula II or III:

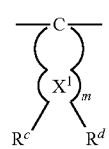

II

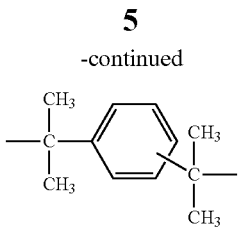
III wherein B in each case is independently hydrogen, a $C_1$-$C_{12}$ alkyl, preferably methyl, or a halogen, preferably chlorine and/or bromine;

x in each case is mutually independently 0, 1, or 2;

p is 0 or 1;

$R^c$ and $R^d$ are mutually independent of each other and are individually selectable for each $X^1$ and are hydrogen or a $C_1$-$C_6$ alkyl, preferably hydrogen, methyl or ethyl;

$X^1$ denotes carbon; and m denotes an integer from 4 to 7, preferably 4 or 5, with the proviso that $R^c$ and $R^d$ simultaneously denote an alkyl on at least one $X^1$ atom.

Exemplary diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyl-phenyl) ethers, bis(hydroxyphenyl)sulfoxides, bis(hydroxyphenyl) ketones, bis(hydroxyl-phenyl)sulfones and 4,4"-bis(hydroxyphenyl)diisopropylbenzenes, as well as derivatives thereof which have brominated and/or chlorinated nuclei. Diphenols which are particularly preferred are 4,4'-dihydroxybiphenyl, bisphenol A, 2,4-bis(4-hydroxyphenyl)-2-methyl-butane, 1,1-bis(4-hydroxyphenyl)-cyclohexane, 1,1-bis(4-hydroxyphenyl)-3,3,5-trimethyl-cyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane. 2,2-bis-(4-hydroxyphenyl)propane (bisphenol A) is particularly preferred. The diphenols can be used individually or as arbitrary mixtures. The diphenols are known from the literature or can be obtained by methods known from the literature. Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

Exemplary chain terminators for the production of the aromatic polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, exemplary are 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used may be about 0.1 mole percent or greater based on the molar sum of the diphenols used in each case. The amount of chain terminators used may be about 10 mole percent or less based on the molar sum of the diphenols used in each case.

The polycarbonates can be branched in the known manner, for example by the incorporation of about 0.05 to about 2.0 mole percent, with respect to the sum of the diphenols used, of trifunctional compounds or of compounds with a functionality higher than three, for example those which contain three or more phenolic groups. Branched polycarbonates useful for the compositions disclosed can be prepared by known techniques, for example several methods are disclosed in U.S. Pat. Nos. 3,028,365; 4,529,791; and 4,677,162; which are hereby incorporated by reference in their entirety. Exemplary branching agents that may be used are tri- or multi-functional carboxylic acid chlorides, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of about 0.01 to about 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)-benzene, 1,1,1-tris(4-hydroxyphenyl)ethane, tris(4-hydroxyphenyl)-phenylmethane, 2,2-bis[4,4-bis(4-hydroxyphenyl)cyclohexyl]-propane, 2,4-bis[1-(4-hydroxyphenyl)-1-methyl-ethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of about 0.01 to about 1.0 mole percent with respect to the diphenols used. Phenolic branching agents can be placed in the reaction vessel with the diphenols. Acid chloride branching agents can be introduced together with the acid chlorides.

Copolycarbonates may be prepared by known processes in the art. In one exemplary embodiment, about 1 to about 25 parts by weight, about 2.5 to about 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature. In another embodiment ester forming monomers may be utilized in the polycarbonate containing polymer preparation process. Exemplary ester forming monomers include dicarboxylic acid halides and hydroxycarboxylic acids. The aromatic dicarboxylic acid dihalides used for the production of the aromatic polyester carbonates may be the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic and terephthalic in a ratio from about 1:20 to about 20:1 may be used. A carbonic acid halide, such as phosgene, may be used in conjunction as a difunctional acid derivative during the production of the polyester carbonates. The aromatic polyester carbonates may also contain incorporated hydroxycarboxylic acids. The aromatic polyester carbonates may be either linear or may be branched. Suitable branching agents are disclosed hereinabove.

Apart from the aforementioned monophenols, exemplary chain terminators for the production of the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator is about 0.1 to about 10 mole percent in each case, with respect to the moles of diphenols in the case of phenolic chain terminators and with respect to the moles of dicarboxylic acid dichlorides in the case of monocarboxylic acid chloride chain terminators.

The one or more polymers containing carbonate monomer units can comprise polycarbonates, co-polycarbonates or blends of polycarbonates and co-polycarbonates. The polycarbonates and/or co-polycarbonates may exhibit a mean weight average molecular weight sufficient to provide the desired properties to articles prepared from the polycarbonates and/or co-polycarbonates as described hereinbefore. The polycarbonates and/or co-polycarbonates may have a mean weight average molecular weights of about 8,000 or greater, about 15,000 or greater or about 30,000 or greater. The polycarbonates and/or co-polycarbonates may have a mean weight average molecular weight of about 200,000 or less, about 80,000 or less, or about 40,000 or less. Unless otherwise indicated, the references to polycarbonate and/or co-polycarbonate "molecular weight" herein refer to weight average molecular weights (Mw) determined by gel permeation chromatography (GPC) using laser scattering techniques with a bisphenol A polycarbonate standard and is given in units of grams per mole (g/mole). The melt flow rate (MFR) of the polycarbonate and/or co-polycarbonate is sufficient to allow use of the blends to prepare desired articles therefrom. The melt flow rate may be from about 3 to about 20 grams per 10 minutes (g/10 min) as determined at 300° C. under a load of 1.2 kg.

The polycarbonates and/or co-polycarbonates may be used in pellet form, powder form or in a mixture thereof. Where used in powder form the particle size is selected for efficiently blending the materials. The particle size may be about 0.1 mm or greater or about 0.5 mm or greater. The particle size may be about 2.0 mm or less or about 1.5 mm or less.

The unfilled polycarbonates or co-polymers thereof may contain one or more flame retardants commonly used in polycarbonate compositions. The flame retardant may be any flame retardant known for use in polycarbonate based compositions which provide flame retardant properties and which do not negatively impact the impact, heat resistance and environmental stress crack resistance properties of the composition. Flame retardants may be used in a sufficient amount to meet the flame retardancy requirements for the final use and in an amount that does not deleteriously impact the impact, heat resistance and environmental stress crack resistance properties of articles prepared from the compositions. Exemplary flame retardants include halogenated compounds, charring salt flame retardants, phosphorous containing compounds, an oligomeric phosphates, poly (block-phosphonato-esters), and/or a poly(block-phosphonato-carbonates) see U.S. Pat. No. 7,645,850 which is incorporated in its entirety. The oligomeric phosphates include bisphenol-A bis(diphenyl phosphate) (BAPP). Classes of flame retardants include halogenated flame retardants. The classes of flame retardants include brominated flame retardants. Exemplary flame retardants include brominated polycarbonates, such as tetrabromobisphenol A polycarbonate oligomer, polybromophenyl ether, brominated BPA polyepoxide, brominated imides, halogenated polyacrylates, such as poly (haloaryl acrylate), poly(haloaryl methacrylate), brominated polystyrenes such as polydibromostyrene and polytribromostyrene, decabromobiphenyl ethane, tetrabromobiphenyl, brominated alpha, omega-alkylene-bis-phthalimides, such as. N,N'-ethylene-bis-tetrabromophthalimide, oligomeric brominated carbonates, especially carbonates derived from tetrabromo-bisphenol A, which, if desired, are end-capped with phenoxy radicals, or with brominated phenoxy radicals, or brominated epoxy resins. Mixtures of halogenated flame retardants may be utilized in the compositions of the invention. Exemplary halogenated flame retardants include brominated polyacrylates, brominated polystyrenes and tetrabromobisphenol A polycarbonate oligomers. The one or more flame retardants may be present in an amount of about 0.1 percent by weight or greater based on the weight of the composition containing unfilled polycarbonates or copolymers thereof, about 1 percent by weight or greater or about 5 percent by weight or greater. The one or more flame retardants may be present in an amount of about 30 percent by weight or less based on the weight of the composition containing unfilled polycarbonates or copolymers thereof, about 20 percent by weight or less. The composition may further comprise a synergist, particularly inorganic antimony compounds. Such compounds are widely available or can be made in known ways. Typical, inorganic synergist compounds include $Sb_2O_5$, $Sb_2O_3$, sodium antimonite and the like. The synergist may be antimony trioxide ($Sb_2O_3$). Synergists may be used at about 0.5 to about 15 by weight percent based on the weight percent of the unfilled polycarbonate or co-polycarbonate composition.

The composition containing unfilled polycarbonates or copolymers thereof may further comprise a fluorinated antidrip agent. Antidrip means to reduce the tendency of the composition to form burning drips in the event of a fire. Fluorinated polyolefins known in the art as antidrip agents may be used in the compositions disclosed. Exemplary fluorinated polyolefins are described in EP-A 0 640 655. They are marketed under the brand name Teflon® 30N by DuPont. The fluorinated polyolefins may be employed both in the pure form and in the form of a coagulated mixture of emulsions of the fluorinated polyolefins with emulsions of the graft polymers or with an emulsion of a copolymer, preferably based on styrene/acrylonitrile, the fluorinated polyolefin being mixed as an emulsion with an emulsion of the graft polymer or of the copolymer and the mixture then being coagulated. The fluorinated polyolefins may furthermore be employed as a precompound with a graft polymer (component B) or a copolymer, such as those based on styrene/acrylonitrile. The fluorinated polyolefins are mixed as powders with a powder or granules of the graft polymer or copolymer and the mixture is compounded in the melt in general at temperatures of about 200 to about 330° C. in conventional units, such as internal kneaders, extruders or twin-screw extruders. The fluorinated polyolefins may also be employed in the form of a masterbatch, which is prepared by emulsion polymerization of at least one monoethylenically unsaturated monomer in the presence of an aqueous dispersion of the fluorinated polyolefin. Monomer components may be styrene, acrylonitrile and mixtures thereof. The polymer is employed as a free-flowing powder, after acidic precipitation and subsequent drying. The coagulates, precompounds or masterbatches may have solids contents of fluorinated polyolefin of about 5 to about 95 weight percent, or about 7 to about 60 weight percent. The one or more anti drip agents may be present in an amount of about 0 percent by weight or greater based on the weight of the composition containing unfilled polycarbonates or copolymers thereof, about 0.05 percent by weight or greater or about 0.1 percent by weight or greater. The one or more anti drip agents may be present in an amount of about 5 percent by weight or less based on the weight of the composition containing unfilled polycarbonates or copolymers thereof, about 2 percent by weight or less or about 1 percent by weight or less.

The composition containing unfilled polycarbonates or copolymers thereof may further contain at least one or more additives commonly used in polycarbonate based compositions. For example, one such additive comprises one or more lubricants, for example mineral oil, epoxidized soybean oil, or the like; a nucleating agent; an anti-static agent; a stabilizer; a filler and/or a reinforcing material such as glass fibers, carbon fibers, metal fibers, metal coated fibers, thermoset fibers, glass beads, mica, silicates, quartz, talc, titanium dioxide, and/or wollastonite alone or in combinations; a dye; or a pigment. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination.

The compositions disclosed may be produced by mixing the particular components in a known manner and melt-compounding and/or melt-extruding them at temperatures of from 200° C. to 300° C. in conventional units such as internal kneaders, extruders and twin-screw extruders. The individual components may be mixed in a known manner both in succession and simultaneously and both at approximately 23° C. (room temperature) and at a higher temperature. The compositions may be injected into a mold to form a substrate of the desired shape.

$CaSiO_3$ is a naturally occurring mineral commonly known as Wollastonite and may also be referred to as calcium meta-silicate. As a naturally occurring mineral there is significant variation in size and other minerals that may be present. $CaSiO_3$ may have a high aspect ratio of greater than 6, 7 or greater, or 14 or greater, and a mean fiber diameter of 1 to 15 µm, 2 to 10 µm, or 4 to 8 µm. The aspect ratio may be up to 44. The $CaSiO_3$ may be referred to as acicular. The $CaSiO_3$ may be present in a sufficient amount to reduce the gloss of polycarbonate and/or co-polycarbonate compositions containing the $CaSiO_3$. The $CaSiO_3$ may be present in the polycarbonate and/or co-polycarbonate compositions containing the $CaSiO_3$ in an amount of about 5 percent by weight or greater or about 10 percent by weight or greater. The $CaSiO_3$ may be present in the polycarbonate and/or co-polycarbonate compositions containing the $CaSiO_3$ in an amount of about 20 percent by weight or less or about 15 percent by weight or less. Below 5 percent by weight there is little impact on gloss of the formed composition. Above 20 percent by weight there is no further improvement in gloss and a risk that the amount of $CaSiO_3$ may reduce the properties of the composition.

The composition may contain a stabilizer salt. The stabilizer salt may be any compound that is a basic buffer which functions to prevent basic materials in the composition from causing the polycarbonates or copolymers of polycarbonates from depolymerizing. Exemplary classes of stabilizer salts include those disclosed in US 2013/0131241, incorporated herein by reference, in particular acids, acid salts and esters of acids derived from a phosphorous containing acid such as phosphoric acid, phosphorous acid, hypophosphorous acid, hypophosphoric acid, phosphinic acid, phosphonic acid, metaphosphoric add, hexametaphosphoric acid, thiophosphoric acid, fluorophosphoric add, difluorophosphoric acid, fluorophosphorous acid, difluorophosphorous acid, fluorohypophosphorous acid, fluorohypophosphoric acid or their combinations. A combination of a phosphorous containing acid and an ester of a phosphorous containing acid may be used used. Alternatively, acids, acid salts and esters of acids, such as, for example, sulphuric acid, sulphites, zinc phosphate, mono calcium phosphate, and the like, may be used. In particular embodiments, the acid stabilizer is phosphorous acid ($H_3PO_3$), phosphoric acid ($H_3PO_4$), zinc phosphate ($Zn_3(PO_4)_2$), zinc dihydrogen phosphate ($ZnH_4P_2O_8$), mono sodium phosphate ($NaH_2PO_4$), or sodium acid pyrophosphate ($Na_2H_2P_2O_7$), and monosodiumphosphate. The stabilizer salt may be present in sufficient amount to prevent depolymerization of the polycarbonates or copolymers of polycarbonates. The stabilizer salt may be present in an amount of about 0.05 percent by weight or greater of the composition containing one or more polycarbonates or copolymers of polycarbonates and $CaSiO_3$. The stabilizer salt may be present in an amount of about 0.5 percent by weight or less of the composition containing one or more polycarbonates or copolymers of polycarbonates and $CaSiO_3$.

The composition containing one or more polycarbonates or copolymers of polycarbonates and $CaSiO_3$ may contain antioxidants. The antioxidant may be present in the one or more polycarbonates or copolymers of polycarbonates before formation of the composition containing one or more polycarbonates or copolymers of polycarbonates and $CaSiO_3$ may contain antioxidants. The antioxidant may be present in sufficient amount to prevent oxidation of the compositions and structures formed. Exemplary antioxidant additives include, for example, organophosphites such as tris(nonyl phenyl)phosphite, tris(2,4-di-t-butylphenyl)phosphite (e.g., "IRGAFOS 168" or "1-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants may be used in amounts of about 0.0001 to about 1 weight percent of the composition containing one or more polycarbonates or copolymers of polycarbonates and $CaSiO_3$. The antioxidants may be present in an amount of about 200 ppm to about 2000 ppm of the polycarbonate based composition containing $CaSiO_3$.

The composition containing one or more polycarbonates or copolymers of polycarbonates and $CaSiO_3$ may contain one or more pigments to provide the desired color in an amount sufficient to provide the desired color, examples include carbon black and titanium dioxide.

Disclosed is a composition containing a blend of a composition containing one or more polycarbonates or copolymers of polycarbonates and $CaSiO_3$ and a composition containing one or more polycarbonates or copolymers of polycarbonates which is unfilled, does not contain $CaSiO_3$. The blend should contain sufficient amount of the composition containing one or more polycarbonates or copolymers of polycarbonates and $CaSiO_3$ to introduce the desired matte appearance. The blend may contain 33 percent by weight or greater of one or more polycarbonates or copolymers of polycarbonates and $CaSiO_3$, as described herein, about 50 percent or greater up to 100 percent by weight. The amount of unfilled polycarbonate or copolycarbonates may be 67 percent or less, down to 0.

Disclosed are sheets comprising polycarbonates and/or copolycarbonates. The sheets may comprise 100 percent of a composition containing one or more polycarbonates or copolymers of polycarbonates and $CaSiO_3$. Alternatively the sheets may comprise at least two layers one of which contains a composition including one or more polycarbonates or copolymers of polycarbonates and $CaSiO_3$ wherein the layer including one or more polycarbonates or copolymers of polycarbonates and $CaSiO_3$ is disposed on at least one surface. The layer including one or more polycarbonates or copolymers of polycarbonates and $CaSiO_3$ may be a blend with unfilled polycarbonates and/or polycarbonates as disclosed hereinbefore. When the sheet comprises more than one layer, the layer comprising one or more polycarbonates or copolymers of polycarbonates and $CaSiO_3$ may be present in sufficient thickness to introduce a matte appearance to the formed sheet. The layer comprising one or more polycarbonates or copolymers of polycarbonates and $CaSiO_3$ may be present in about 0.5 percent of the thickness of the sheet or greater, about 5 percent of the thickness of the sheet or greater, or about 10 percent of the thickness or greater. The layer comprising one or more polycarbonates or copolymers of polycarbonates and $CaSiO_3$ may be present in about 99.5 percent of the thickness of the sheet or less, about 95 percent of the thickness of the sheet or less, or about 90 percent of the thickness or less. The unfilled layer may be present in about 90 percent of the thickness of the sheet or less, about 95 percent of the thickness of the sheet or less, or about 99.5 percent of the thickness or less. The unfilled layer may be present in about 0.5 percent of the thickness of the sheet or greater, about 5 percent of the thickness of the sheet or greater, or about 10 percent of the thickness or greater.

The thickness of the formed sheets may be sufficient for the intended use. The thickness may be 1 mm or greater or about 10 mm or greater. The thickness of the formed sheets may be sufficient for the intended use. The thickness may be 20 mm or less or about 10 mm or less.

The sheets may be prepared using any known process for preparing polycarbonate based sheets, for example extrusion or co-extrusion, lamination, co-lamination and the like. The surface of the sheets can be textured using embossing rolls, and the like. The sheets may be further processed to make shaped articles by thermoforming and the like.

Disclosed are a number of embodiments.

Embodiment 1

A composition comprising one or more polymers consisting of polycarbonate or a copolymer of greater than 50 mole percent of polycarbonate units and less than 50 mole percent of monomer units which copolymerize with polycarbonate units; and 5 to 20 percent by weight of one or more minerals containing high aspect ratio $CaSiO_3$.

Embodiment 2

A composition according to Embodiment 1 which comprises a stabilizing salt.

Embodiment 3

A composition according to Embodiment 1 or 2 which comprises from about 0.05 to about 0.5 percent by weight of a stabilizing salt.

Embodiment 4

A composition according Embodiment 2 or 3 wherein the stabilizing salt is a salt of a phosphorous based acid.

Embodiment 5

A composition according to Embodiment 4 wherein the stabilizing salt is monosodiumphosphate.

Embodiment 6

A composition according to any of the preceding embodiments comprising one or more antioxidants useful with polycarbonate containing compositions.

Embodiment 7

A composition according to any one of the preceding embodiments consisting of one or more polymers consisting of polycarbonate or a copolymer of greater than 50 mole percent of polycarbonate units and less than 50 mole percent of monomer units which copolymerize with polycarbonate units; 5 to 20 percent by weight of one or more minerals containing high aspect ratio $CaSiO_3$; a stabilizing salt; and one or more antioxidants useful with polycarbonate containing compositions.

Embodiment 8

A composition according to any one of the preceding embodiments wherein the one or more minerals containing high aspect ratio $CaSiO_3$ are present in an amount of about 10 to about 15 percent by weight of the composition.

Embodiment 9

A composition according to any one of the preceding embodiments wherein the one or more antioxidants useful with polycarbonate containing compositions are present in an amount of about 200 to about 2000 parts per million by weight based on the weight of the composition.

Embodiment 10

A composition according to any one of the preceding embodiments wherein the one or more polycarbonates are branched, linear or a mixture of branched and linear polycarbonates.

Embodiment 11

A composition which comprises a blend of a 33 percent by weight or greater of a composition according to any one of embodiments 1 to 10 and one or more unfilled polycarbonates.

Embodiment 12

A composition according to Embodiment 11 wherein the unfilled polycarbonates are present in an amount of about 0 to about 67 percent by weight of the composition.

Embodiment 13

A composition comprising a sheet prepared from a composition according to any one of Embodiments 1 to 13.

Embodiment 14

A composition according to Embodiment 13 wherein the top gloss measured according to ISO 2813 with a 60° angle of incidence of about 60 or less.

Embodiment 15

A composition according to Embodiment 13 wherein the top gloss measured according to ISO 2813 with a 60° angle of incidence of about 40 or less.

Embodiment 16

A composition according to any one of Embodiments 13 to 15 wherein sheet consists essentially of a composition according to any one of Embodiments 1 to 12.

Embodiment 17

A composition according to any one of Embodiments 13 to 15 which comprising two or more layers wherein at least one layer comprises one or more polymers consisting of polycarbonate or a copolymer of greater than 50 mole percent by weight of polycarbonate units and less than 50 mole percent of monomer units which copolymerize with polycarbonate units; and 5 to 20 percent by weight of one or more minerals containing high aspect ratio CaSiO₃; and at least one layer comprises one or more unfilled polycarbonates.

Embodiment 18

A composition according to Embodiment 17 wherein the layer comprising one or more polymers consisting of polycarbonate or a copolymer of greater than 50 mole percent or greater of polycarbonate units and less than 50 mole percent of monomer units which copolymerize with polycarbonate units; and 5 to 20 percent by weight of one or more minerals containing high aspect ratio CaSiO₃ is 0.5 to 10 percent of the thickness of the sheet and the layer which comprises one or more unfilled polycarbonates is 99.5 to 90 percent of the thickness of the sheet.

Embodiment 19

A composition according to any one of Embodiments 13 to 18 wherein the one or more layers are formed by extrusion or co-extrusion.

Embodiment 20

A composition according to any of Embodiments 13 to 19 wherein one or both of the surfaces of the sheet comprise a layer of a composition comprising one or more polymers consisting of polycarbonate or a copolymer of greater than 50 mole percent by weight of polycarbonate units and less than 50 mole percent of monomer units which copolymerize with polycarbonate units; and 5 to 20 percent by weight of one or more minerals containing high aspect ratio CaSiO₃.

Illustrative Embodiments

The following examples are provided to illustrate the invention, but are not intended to limit the scope thereof. All parts and percentages are by weight unless otherwise indicated.

A number of samples with varying amounts of CaSiO₃ with and without a fixed amount of 0.25 wt % TiO2 and 0.000125 wt % carbon black are formed from by extrusion using CALIBRE™ 200-10 polycarbonate. The sheets have the dimension of 300×300×3 mm. The formed sheets are tested for gloss using ISO 2813 with a 60° angle of incidence. The top gloss refers to sheets that were extruded with a melt temperature of 300° C. and well visible melt bank in front of the 2$^{nd}$ gloss roll of a 3 roll upstack roll stack. The bottom gloss refers to sheets that were extruded with a melt temperature of 280° C. and no visible melt bank in front of the 2nd gloss roll of a 3 roll upstack roll stack. The following other tests are performed: tensile modulus using ISO 527. The results are compiled in the tables.

| Example | 1 | 2 | 3 | 4 | 5 | 6 |
|---|---|---|---|---|---|---|
| % CaSiO3 | 0 | 5 | 10 | 15 | 15 | 0 |
| % TiO2 | 0.25 | 0.25 | 0.25 | 0.25 | 0 | 0 |
| % Carbon black | 0.000125 | 0.000125 | 0.000125 | 0.000125 | 0 | 0 |
| Properties | | | | | | |
| Top gloss | >100 | 60 | 38 | 33 | 29 | >100 |
| Bottom gloss | >100 | 25 | 17 | 16 | 19 | >100 |
| Pencil Hardness | HB | 2H | 2H | 2H | H | HB |
| Tensile Modulus [MPa] | 2349 | 2955 | 3694 | 4652 | 4475 | 2253 |

| Example | Percent CaSiO₃ | Top Gloss | Bottom Gloss |
|---|---|---|---|
| 1 | 0 | 105 | 104 |
| 2 | 5 | 60 | 25 |
| 3 | 10 | 38 | 17 |
| 4 | 15 | 33 | 16 |

The pencil hardness increased from HB to H-2H according to test ASTM D3363 from 0 percent to 15 percent CaSiO₃.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising one or more polymers consisting of polycarbonate or copolycarbonates wherein the copolycarbonates contain greater than 50 mole percent of polycarbonate units and less than 50 mole percent of monomer units which copolymerize with polycarbonate units;
   5 to 20 percent by weight of one or more minerals containing high aspect ratio $CaSiO_3$ having an aspect ratio of 6 or greater; and
   a salt of a phosphorous based acid, wherein sheets formed of the composition have a matte appearance and exhibit a top gloss measured according to ISO 2813 with a 60° angle incidence of about 60 or less.

2. A composition according to claim 1 which comprises from about 0.05 to about 0.5 percent by weight of the salt of a phosphorous based acid.

3. A composition according to claim 1 comprising one or more antioxidants useful with polycarbonate containing compositions.

4. A composition according to claim 3 wherein the one or more antioxidants useful with polycarbonate containing compositions are present in an amount of about 200 to about 2000 parts per million by weight based on the weight of the composition.

5. A composition according claim 1 wherein the polycarbonates or copolycarbonates are branched, linear or a mixture of branched and linear polycarbonates.

6. A formulation which comprises a blend of a 33 percent by weight or greater of a composition according to claim 1 and one or more unfilled polycarbonates wherein the unfilled polycarbonates are present in an amount of up to about 67 percent by weight of the formulation.

7. A sheet prepared from a composition according to claim 1.

8. A sheet according to claim 7 comprising
   two or more layers wherein at least one layer comprises one or more polymers consisting of polycarbonate or copolymers of greater than 50 mole percent by weight of polycarbonate units and less than 50 mole percent of monomer units which copolymerize with polycarbonate units;
   5 to 20 percent by weight of one or more minerals containing high aspect ratio $CaSiO_3$ having an aspect ratio of 6 or greater, and a salt of a phosphorous based acid; and
   at least one layer comprises one or more unfilled polycarbonates.

9. A sheet according to claim 8 wherein the layer comprising one or more polymers consisting of polycarbonate or copolymers of greater than 50 mole percent or greater of polycarbonate units and less than 50 mole percent of monomer units which copolymerize with polycarbonate units; 5 to 20 percent by weight of one or more minerals containing high aspect ratio $CaSiO_3$ having an aspect ratio of 6 or greater, and a salt of a phosphorous based acid is 0.5 to 10 percent of the thickness of the sheet and the layer which comprises one or more unfilled polycarbonates is 99.5 to 90 percent of the thickness of the sheet.

10. A sheet according to claim 8 wherein the two or more layers are formed by extrusion, co-extrusion, lamination or co-lamination.

11. A sheet according to claim 7 wherein one or both of the surfaces of the sheet comprise a layer of a composition comprising one or more polymers consisting of polycarbonate or a copolymer of greater than 50 mole percent by weight of polycarbonate units and less than 50 mole percent of monomer units which copolymerize with polycarbonate units; and 5 to 20 percent by weight of one or more minerals containing high aspect ratio $CaSiO_3$ having an aspect ratio of 6 or greater, and a salt of a phosphorous based acid.

12. A composition according to claim 1 wherein the salt of a phosphorous based acid is monosodium phosphate.

13. A composition according to claim 1 containing one or more pigments.

14. A composition according to claim 13 wherein the one or more pigments comprise carbon black and titanium dioxide.

* * * * *